United States Patent [15] 3,638,065
Ueno [45] Jan. 25, 1972

[54] COLOR TELEVISION PICTURE-REPRODUCING DEVICE

[72] Inventor: Ichiro Ueno, Tokyo, Japan
[73] Assignee: Victor Company of Japan, Limited, Yokohama, Japan

[22] Filed: Dec. 22, 1969
[21] Appl. No.: 887,140

[30] Foreign Application Priority Data

Dec. 24, 1968 Japan....................................43/94425
July 26, 1969 Japan....................................44/58788

[52] U.S. Cl. ..................................315/13, 315/12, 315/21 C, 178/5.2
[51] Int. Cl. ..........................................................H01j 29/50
[58] Field of Search ....................315/12, 13, 21 C; 178/5.2 R

[56] References Cited

UNITED STATES PATENTS 3,443,023 5/1969 Cooper, Jr. ..............................178/5.2
3,440,341 4/1969 Reekie et al. ............................178/5.2

OTHER PUBLICATIONS

H. B. Law, Convergence Means for 3 Beam Color Kinescope, 3/12/58, P. 1–2, RCA Technical Notes.

*Primary Examiner*—Rodney D. Bennett, Jr.
*Assistant Examiner*—N. Moskowitz
*Attorney*—Louis Bernat

[57] ABSTRACT

A color television picture reproducing device provides varying time lags to a plurality of color signals. These time lags cause an intensity modulation of a plurality of electron beams produced by at least one electron gun unit and not simultaneously concentrated on a particular point on a phosphor screen. Thus, a plurality of television pictures may be reproduced on the phosphor screen by the electron beams striking phosphors on the phosphor screen. These pictures can be made to coincide with one another in space to provide an acceptable reproduced color television picture.

10 Claims, 13 Drawing Figures

INVENTOR

ICHIRO UENO

BY

ATTORNEY

INVENTOR
ICHIRO UENO
BY Louis Bernat
ATTORNEY

INVENTOR
ICHIRO UENO

BY Louis Bernat
ATTORNEY

INVENTOR
ICHIRO UENO

BY Louis Bernat
ATTORNEY

COLOR TELEVISION PICTURE-REPRODUCING DEVICE

This invention relates to color television picture reproducing devices. More particularly, the invention provides a device for reproducing a color television picture.

A plurality of television pictures are produced by at least one electron gun unit. The electron beams strike phosphors on a phosphor screen in such a manner that they are not concentrated simultaneously on a particular point on the screen. However, the resulting images can be made to coincide with one another in space, so that an acceptable color television picture can be reproduced on the phosphor screen.

Color television picture reproducing devices of the prior art provide a color television picture by superimposing, in space, a plurality of pictures. These pictures are reproduced by causing a plurality of electron beams to strike phosphors on a phosphor screen. Including a color picture tube of the triple-gun shadow-mask type and a (Trinitron) (trade name) tube.

In the case of the aforesaid (Trinitron) tube, three electron beams are electromagnetically or electrostatically concentrated on a particular point. This makes it necessary to provide an elongated neck portion in the picture tube and also to cause the electron beams to be spaced apart from one another, at least to a certain degree. The spacing occurs under a deflecting yoke in order that each electron beam may pass through a shadow mask or shadow grid and strike a corresponding phosphor on a phosphor screen. Under such conditions, each electron beam is deflected in a predetermined direction and concentrated on a particular point on the phosphor screen. This arrangement has a disadvantage in that the deflection angles of the electron beams are great. Consequently, the spots of the electron beams are degraded.

Accordingly, a principal object of this invention is to provide a color television picture reproducing device which overcomes all the aforementioned and other disadvantages of conventional color television picture reproducing devices.

Another object of the invention is to provide a color television picture reproducing device in which a plurality of pictures are reproduced on a phosphor screen by causing a plurality of electron beams striking phosphors on the phosphor screen to be superimposed one on another in space, whereby an acceptable color television picture can be reproduced on the phosphor screen.

A further object of the invention is to provide a color television picture reproducing device in which a plurality of pictures are reproduced on a phosphor screen by causing a plurality of electron beams to strike phosphors on the phosphor screen. These beams are superimposed one on another by providing varying time lags in the various color signals for the primary colors. These delays provide an intensity modulation of the respective electron beams, whereby an acceptable color television picture can be reproduced on the phosphor screen.

Still another object of the invention is to provide a color television picture reproducing device which provides an acceptable color television picture on the phosphor screen, with good concentration on all the areas of the screen without requiring the use of a complex device for making convergence adjustments.

A still further object of the invention is to provide a color television picture reproducing device in which a single electron beam is used. This beam is converted into a plurality of electron beams representing primary colors. A plurality of reproduced pictures of primary colors are produced by such plurality of electron beams of primary colors. These pictures are caused to coincide with one another in space.

Yet another object of the invention is to provide a color television picture reproducing device which can be operated with a deflecting current of low value.

Yet a further object of the invention is to provide a color television picture reproducing device which can readily be assembled and produced at low cost.

A still further object of the invention is to provide a color television picture reproducing device which is easier to adjust and which has better characteristics than conventional devices.

Additional objects as well as features and advantages of the invention will become evident from the description set forth hereinafter when considered in conjunction with the accompanying drawings, in which.

Figure 1:
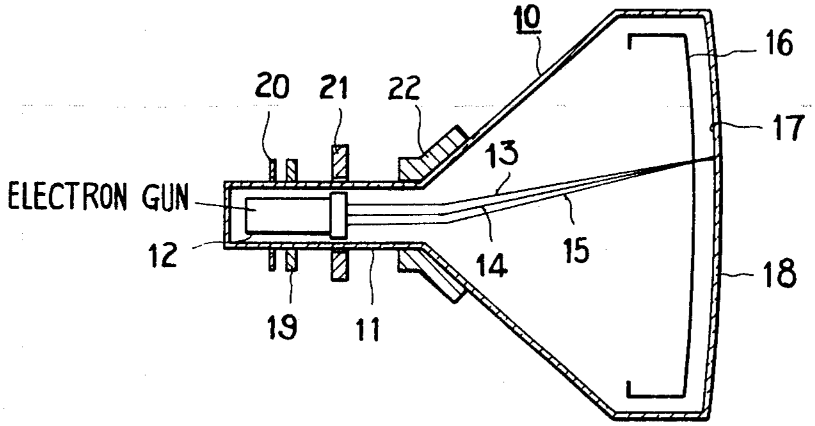
FIG. 1 is a schematic sectional view in explanation of a conventional triple-gun shadow-mask type color television picture tube.

A conventional color picture tube operates so that a plurality of electron beams are concentrated on a specific point on a phosphor screen. In the case of the triple-gun shadow-mask type of color television picture tube shown in FIG. 1, for example, three electron beams 13, 14 and 15 are produced by a triple-gun unit 12. These guns are arranged and sealed in a neck portion 11 of a picture tube 10. The three beams pass through the apertures of a shadow-mask 16 and strike the three different color-emitting phosphors which are affixed to the phosphor screen in a regular triangle pattern, as is well known.

To attain the picture the triple-gun unit is mounted in the neck portion 11 so that each of the three guns is disposed in a position corresponding to each apex of a regular triangle. Each of the three guns is tilted toward the central point of a panel 18 at the face of the picture tube 10. Thus, the three electron beams 13, 14 and 15 may be concentrated on the central point when they are not deflected. Moreover, it is necessary to provide a color-purifying magnet 19, a blue lateral position magnet 20 and a convergence coil 21 on the picture tube for making color position adjustments. Such a picture tube has a disadvantage in that it is not easy to handle it.

An additional disadvantage of the conventional picture tube of the type described lies in the fact that, since the three guns of the triple-gun unit 12 are sealed in the single neck portion 11 of the tube, the neck portion 11 must inevitably have a large diameter. This makes it necessary to supply a current of high value to a deflecting yoke 22 for directing the electron beams.

Figure 2:
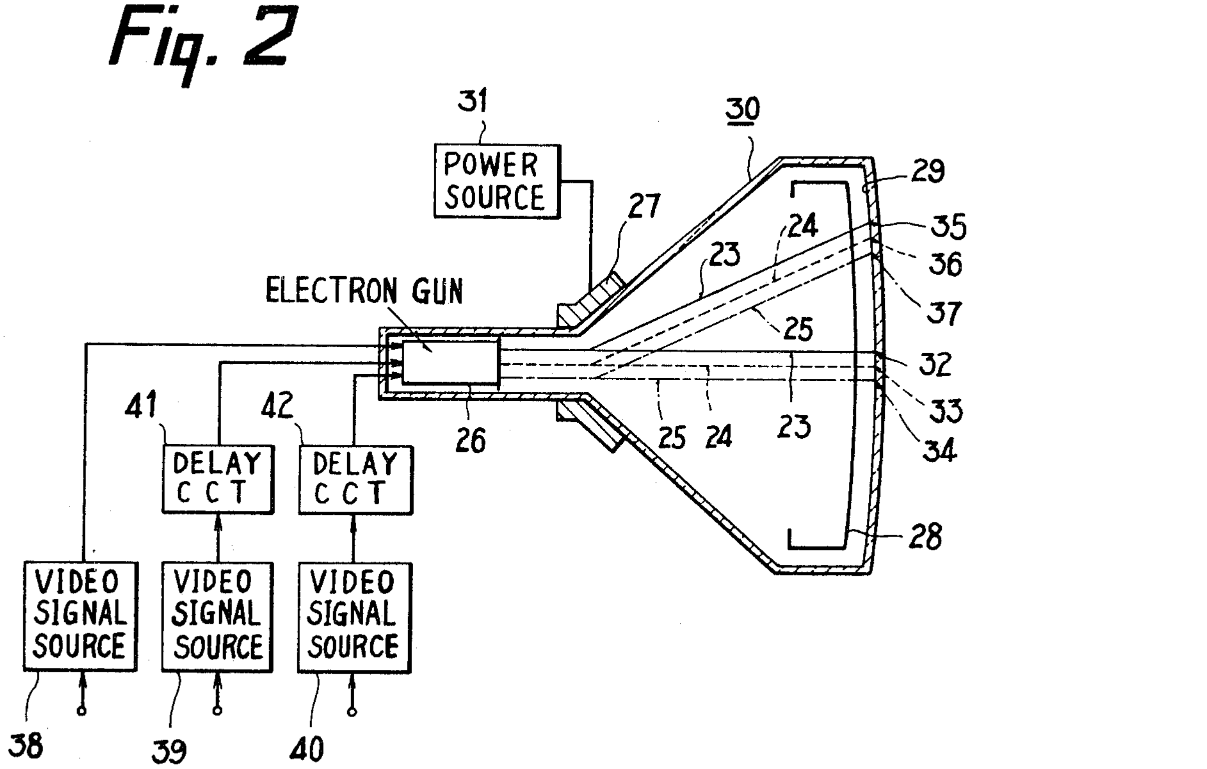
FIG. 2 is a block diagram of a first embodiment of this invention.

The first and second embodiments of this invention will be explained in detail with reference to FIGS. 2 and 3 respectively. FIG. 2 shows the invention as incorporating a triple-gun shadow-mask type color television picture tube 30. A plurality of electron beams, say three electron beams 23, 24 and 25, are produced by a triple-gun unit. These beams move parallel to one another, pass through a deflecting yoke 27, and strike a phosphor screen 29 after passing through a shadow-mask 28.

Figure 3:
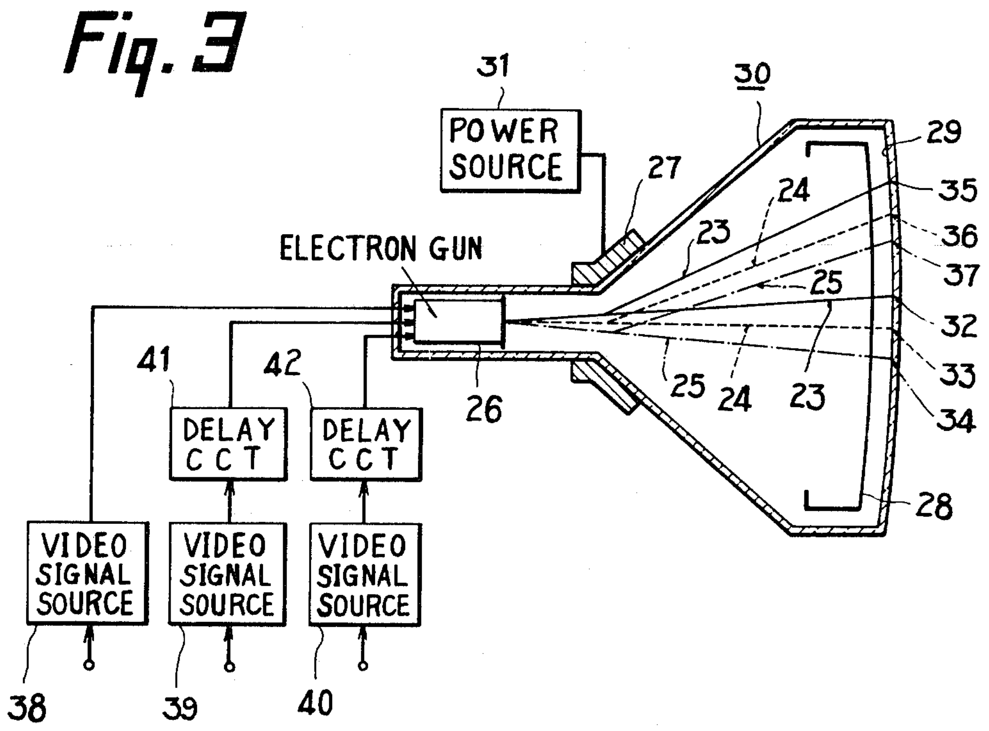
FIG. 3 is a block diagram of a second embodiment of this invention.

FIG. 3 shows the device of this invention as incorporated in a triple-gun shadow-mask type color television picture tube 30. Here a plurality of electron beams, say three electron beams 23, 24 and 25, are moved with an outwardly directed angular displacement, to pass through the deflecting yoke 27 and strike the phosphor screen 29 after passing through the shadow-mask 28.

In both FIGS. 2 and 3, the points 32–34 indicate where the electron beams 23, 24 and 25 strike the phosphor screen 29 at the same time when a current does not flow through the deflecting yoke 27, for causing a deflection of the electron beams. The yoke 27 is powered from a deflecting power source 31. The points 35–37 indicate where the electron beams 23, 24 and 25 strike the phosphor screen 29, at the same time, when the electron beams are deflected by a given degree.

Intensity modulation of the electron beam 23 is effected by a color signal from a video signal source 38. Intensity modulation of the electron beams 24 and 25 is effected by color signals from video signal sources 39 and 40, respectively. Three pictures from the video signal sources 38, 39, and 40 are reproduced on the phosphor screen 29 in such a manner that they are displaced from one another in terms of space.

Let us assume that the three electron beams 23, 24 and 25 strike the phosphor screen 29 at points 32, 33 and 34 respectively at a given time $t_1$. Then, the beams 23, 24 and 25 are deflected so that the electron beam 24 reaches the phosphor screen 29 at the point 34 at a time $t_2$, a certain time after the time $t_1$. The electron beam 23 reaches the point 34 at a time $t_3$, a certain time after $t_2$. A picture produced at the point 34, on the phosphor screen 29, would then be a composite of a picture produced by the electron beam 25 at a time $t_1$, a picture produced by the electron beam 24 at the time $t_2$ and a picture produced by the electron beam 23 at the time $t_3$. This time relationship would hold true, not only with the arrangement in which the three bright spots are horizontally formed by three electron beams on the phosphor screen on the same scanning line, but also with the arrangement in which the bright spots formed by three electron beams are displaced vertically from one another.

In the first and second embodiments of the invention, time lags correspond to the differences in time when the electron beams 23, 24 and 25 successively pass through a given point (including its neighborhood) on the phosphor screen 29. For example, this may be the point 34. These lags are given to the signals for effecting intensity modulation of the electron beams 23, 24 and 25. Thus, three television pictures produced by the electron beams 23, 24 and 25 may be superimposed one on another in space to provide a television picture in the color television picture tube 30 wherein the electron beams 23, 24 and 25 are produced and caused to strike the phosphor screen such that they are not simultaneously concentrated on a particular point on the phosphor screen 29.

According to the present invention, a time lag is provided for each of the color signals to intensity modulate the respective electron beams with respect to a reference, which is the color signal that first passes through a given point on the phosphor screen. (In the illustrated case, the reference color signal for controlling the intensity modulation is the electron beam 23). The time lag given to the color signal, causes the intensity modulation of each electron beam. The time lags become greater in proportion to the delay of the respective electron beam passing through the given spot relative to the electron beam being used as a reference.

The time lags imparted to the color signals for effecting intensity modulation of the electron beams 23, 24 and 25 in the first and second embodiments of this invention shown in FIGS. 2 and 3 respectively could be expressed, in terms of the symbols $t_1$, $t_2$ and $t_3$. As used in the description, the zero second $t_o$ is the lag for the color signal for effecting intensity modulation of the electron beam 23. The time $t_2$–$t_1$ second is the lag for the color signal for effecting intensity modulation of the electron beam 24. The time $t_3$–$t_1$ second is the lag for the color signal for effecting intensity modulation of the electron beam 25.

The time lags provided to the signals for effecting intensity modulation of the electron beams are given through delay circuits 41 and 42 connected to the video signal sources 39 and 40 respectively. In the embodiments shown, no delay circuit is connected to the video signal source 38 because the color signal from the source 38 is used as a reference for time lag. However, a delay circuit may also be connected to the video signal source 38. Preferably, each of the delay circuits is constructed such that the delay in time can be varied.

It will be understood that, according to this invention, three pictures may be produced on the phosphor screen 29 by the electron beams 23, 24 and 25 which strike the phosphor screen 29. These pictures can be superimposed one on another to provide an acceptable television picture on the phosphor screen 29. The aforesaid time lags are imparted to the signals used for effecting intensity modulation of the electron beams 23, 24 and 25 of the color television picture tube 30.

In cases where the color signals for primary colors for a color television picture are provided by the video signal sources 38, 39 and 40, the reproduced picture is a color television picture. A color television picture can also be provided as a reproduced picture by providing predetermined time lags to color difference signals and brightness signals before they are applied to the color television picture tube.

The color television picture tube 30, used for carrying the present invention into practice, may be of the type in which the electron beams 23, 24 and 25 are produced by the electron gun unit 26. These beams are moved so that the outside beams diverge from the center beam. The spacing between the points at which the electron beams 23, 24 and 25 strike the phosphor screen 29 when the electron beams are not deflected will be somewhat displaced from the points at which the electron beams 23, 24 and 25 strike the phosphor screen 29 when the electron beams are deflected. However, this error can be corrected by varying the deflection waveform so as to partially vary the sweep rate. The error is not of significance in the case of a picture tube of smaller deflection angle.

The incorporation of the device of this invention in a color television picture tube would, in principle, cause a reduction in the width of reproduced pictures. It is possible, however, to reproduce pictures without reducing their width by reducing the flyback time.

The third embodiment of the invention will now be explained with reference to FIGS. 4 to 8.

Figure 4:
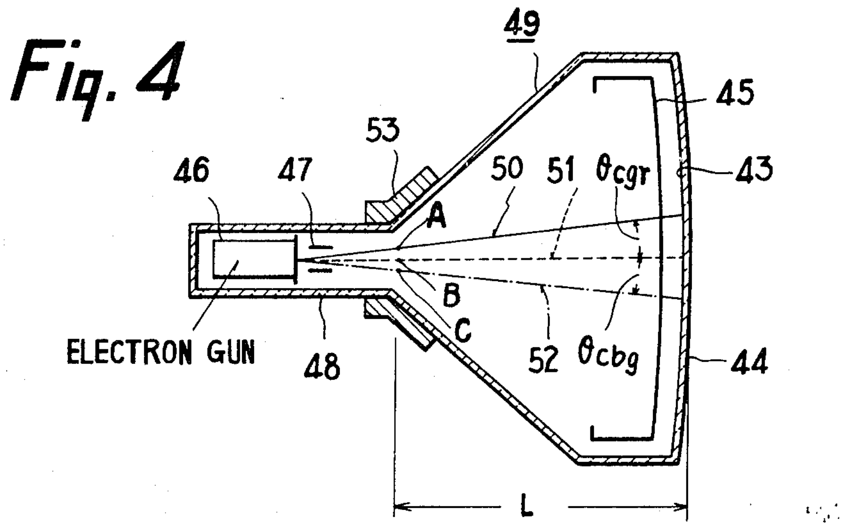
FIG. 4 is a schematic sectional view in explanation of a single-gun shadow-mask type color television picture tube provided with a beam-oscillating electrode which constitutes a third embodiment of the invention.
Figure 5:
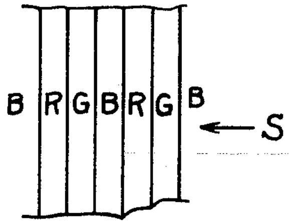
FIG. 5 is a cross-sectional view showing one example of the arrangement of phosphor strips formed on a phosphor screen of a color television picture tube.

FIG. 4 shows, in a schematic view, a single-gun shadow-mask type color television picture tube provided with a beam oscillating electrode. FIG. 4 will be explained before explaining the third embodiment of this invention. In FIG. 4, there is shown a color television picture tube 49 in which a phosphor screen 43 is formed as a panel 44 composed of a multitude of blue, red and green phosphor strips arranged in side by side relation with one another and disposed normal to the direction of scanning S as shown in FIG. 5. A shadow-mask 45 is spaced apart from the phosphor screen 43 a small distance. The neck 48 includes a single-gun unit 46 and a beam oscillating electrode 47 for oscillating a single electron beam produced by the electron gun unit 46. The effect is to turn the beam successively into a plurality of equivalent electron beams, say three electron beams.

In FIG. 4, the reference numerals 50, 51 and 52 designate positions successively assumed by a single electron beam produced by the single-gun unit 46. The electron beam is successively converted by the beam oscillating electrode 47 into electron beams for red, green and blue signals respectively when the deflecting yoke 53 carries no current. The single electron beam is disposed in the position 52 in a given instant, in the position 51 in the next instant, and in the position 50 in the next instant. The reference symbols A, B and C designate points in a plane at the center of deflection.

Figure 6:
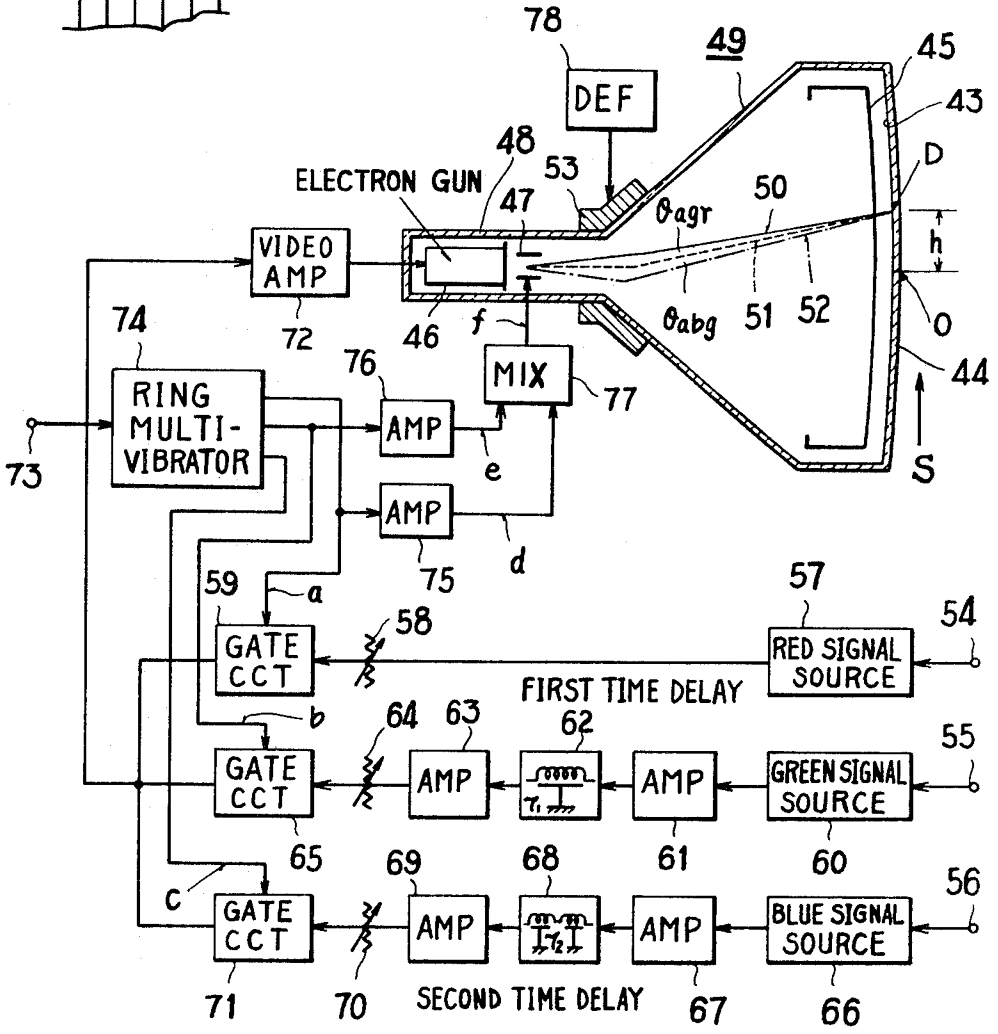
FIG. 6 is a block diagram of a third embodiment of this invention.

Let the distance between the point A and point B and between the point B and point C be represented by $L_1$ and $L_2$ respectively. Let the distance between the center of deflection and the phosphor screen 43 be represented by L in FIG. 4 wherein no deflection of the electron beam is effected. Also, let the distance between the center axis O of the tube and a point D on the phosphor screen be represented by $h$. Let the angles formed at the point D by the electron beams 52 and 51 and the electron beams 51 and 50 respectively be represented by $\theta abg$ and $\theta agr$ respectively. FIG. 6 shows the electron beams 52, 51 and 50 superimposed one on another as they successively pass the point D. They are produced from the single electron beam by the beam-oscillating electrode 47 when the electron beam is deflected. Then, the angle $\theta abg$ and $\theta agr$ can be expressed as follows in accordance with the law of cosine of trigonometric function:

$$\theta abg = \mathrm{Cos}^{-1}\left[(L^2+h^2+hL_1)/\sqrt{(L^2+h^2)\{L^2+(h+L_1)^2\}}\right] \quad 1$$

$$\theta agr = \mathrm{Cos}^{-1}\left[(L^2+h^2-hL_2)/\sqrt{(L^2+h^2)\{L^2+(h-L_2)^2\}}\right] \quad 2$$

(If the radius of curvature of the phosphor screen is represented by R, the $L$ in the formulas 1 and 2 can be expressed as $L=\sqrt{R^2-h^2-(R-L)}$.

In the standard television system, the value of sweep time for each scanning line is 1/15750 second minus the value of time of the horizontal flyback period. If the time $t_o$ required for causing deflection of the horizontal scanning line through a unit deflection angle horizontally is obtained by assuming the value of sweep time to be 52.7 microseconds and by representing the angle of deflection of the electron beam by the deflecting yoke 53 as $\theta_o$, the following formula can be obtained:

$$t_o \text{ (microseconds)} = 52.7/\theta_o \quad 3$$

The angles formed by the electron beams 52 and 51 and the electron beams 51 and 50 are represented by $\theta cbg$ and $\theta cgr$ respectively in FIG. 4. The differences between the electron beams in time at which the electron beams successively pass the point D in FIG. 6 are obtained by using the angles $\theta cbg$ and $\theta cgr$ and the formulas 1, 2 and 3. The differences in time $trg$ and $tgb$ between the electron beams 50 and 51 and between the electron beams 51 and 52 respectively can be expressed as follows:

$$trg\ (\theta cgr+\theta agr)\ t_o \quad 4$$

$$tgb=(\theta cbg+\theta abg)\ t_o \quad 5$$

Thus, it will be understood that the electron beams 50, 51 and 52 are produced and moved at an outwardly directed angle and deflected by the deflecting yoke 53, to reproduce television pictures on the phosphor screen 43. The three television pictures reproduced on the phosphor screen by the respective electron beams are displaced from one another in space.

Therefore, video signals having time lags expressed by formulas 4 and 5 are used, for example, for effecting intensity modulation of the electron beams 50, 51 and 52. The displacement in space of the pictures reproduced on the phosphor screen by the electron beams 50, 51 and 52, with time lags between them, can be corrected. Thus, the three television pictures provided on the phosphor screen 43 by the electron beams 50, 51 and 52 can be made to coincide with one another in space.

FIG. 6 is a block diagram of the third embodiment of this invention. Video signals are introduced into the system through input terminals 54, 55 and 56. A signal from a red signal source 57 is supplied to a first gate circuit 59 through a voltage controller 58. A signal from a green signal source 60 is supplied to a second gate circuit 65 through an amplifier 61, first delay circuit 62, amplifier 63 and voltage controller 64. A signal from a blue signal source 66 is supplied to a third gate circuit 71 through an amplifier 67, second delay circuit 68, amplifier 69 and voltage controller 70. The outputs of the gate circuit 59, 65 and 71 are supplied to a video amplifier 72 and applied to input electrodes of the single-gun unit 46 of the color television picture tube 49. On the other hand, a synchronizing signal (15.75 $KH_z$) for the video signals is supplied through an input terminal 73 to a ring multivibrator 74.

Figure 8A:
FIGS. 8A to 8F are graphical diagrams of model waveforms in explanation of the operation of essential portions of the block diagram of FIG. 6.
Figure 8B:
Figure 8C:

A first signal $a$ as shown in FIG. 8A, for example, is produced by the ring multivibrator 74 and supplied to the first gate circuit 59. The latter gate produces an output signal corresponding to the red signal alone. A second signal $b$ as shown in FIG. 8B is supplied to the second gate circuit 65 with any time lag as desired. The latter gate 65 produces an output signal corresponding to the green signal alone and having a time lag (0.85 microsecond in this embodiment) with respect to the output signal of the first gate circuit 59 corresponding to the red signal. A third signal $c$ as shown in FIG. 8C is supplied to the third gate circuit 71 with any time lag as desired. The latter gate 71 produces an output signal corresponding to the blue signal alone and having a time lag (about 1.7 microsecond in this embodiment) with respect to the output signal of the second gate circuit corresponding to the green signal.

Figure 8D:
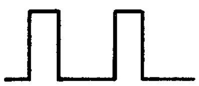
Figure 8E:

The first signal $a$ from the ring multivibrator 74 is supplied to an amplifier 75 having a bigger gain which produces an output signal $d$ as shown in FIG. 8D. The second signal $b$ is supplied to an amplifier 76 having a smaller gain (for example, about half the gain of the amplifier 75) with any time lag as desired with respect to the first signal supplied to the amplifier 75. The amplifier 76 produces an output signal $e$ as shown in FIG. 8E.

Figure 8F:
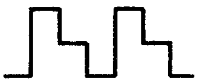

The signals $d$ and $e$ are supplied to a mixer 77 which produces an output in the form of a stepped wave signal $f$ as shown in FIG. 8F. This signal is supplied to the beam oscillating electrode 47 mounted between the electron gun unit 46 and deflecting yoke 53. A single electron beam produced by the electron gun unit 46 is successively converted into three electron beams of three primary colors by the stepped wave signal $f$ supplied to the beam oscillating electrode 47.

Synchronously operating the ring multivibrator 74 and the gate circuits 59, 65 and 71 gate signals in accord with the time division system. A plurality of color signals of red, green and blue, for example, are applied to video signal input electrodes of the television picture tube respectively. The electron beams are made into the electron beams which are intensity modulated in accord with the time division system. The aforementioned plurality of signals of different colors are supplied from the signal sources 57, 60 and 66 respectively through the first and second delay circuits 62 and 68. This provides the time lags described by the formulas 4 and 5 to the signals of different colors. In FIG. 6, a power source 78 supplies a current to the deflecting yoke 53.

In the embodiment shown and described, the single electron beam is electrostatically converted into a plurality of electron beams representing the primary colors, the conversion being accomplished by means of the beam-oscillating electrode 47. Oscillation and separation may be effected electromagnetically by using coils in place of the beam-oscillating electrode 47. The present invention is applicable to a color television picture tube wherein three electron beams are taken out from a single-gun unit and converged by means of a concentrating electrode.

The television picture tube of FIG. 6 is constructed in the same manner as the television picture tube of FIG. 4. It is to be understood that the invention is not limited to a shadow-mask of the type in which it is in the form of a perforated plate. The shadow-mask may be of the type in which slits are formed in a plate. It is also to be understood that the system of time-division used with the signals of different colors in this invention is not limited to the dot sequential system but may be of the line sequential system or the field sequential system.

Figure 7:
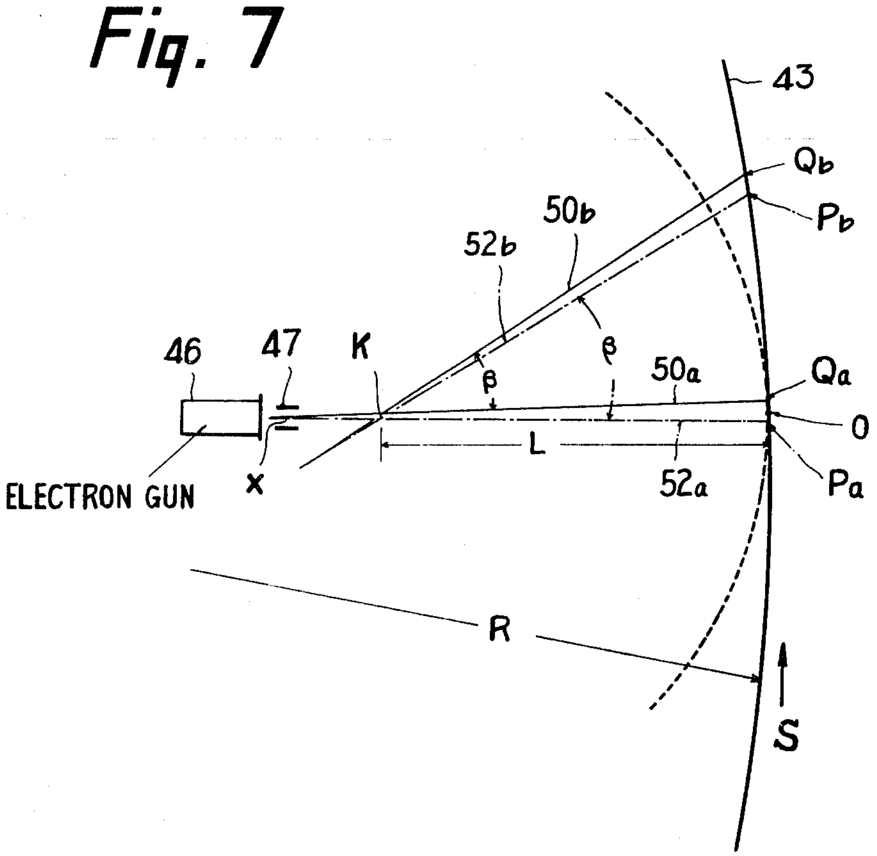
FIG. 7 is a schematic drawing in explanation of the operation which causes a single electron beam produced by a single-gun unit to be converted into a plurality of electron beams of primary colors by an oscillating electrode which scans the phosphor screen.

FIG. 7 shows the manner in which a single beam produced by the electron gun unit 46 scans the phosphor surface 43 as it is converted by the beam-oscillating portion (the beam-oscillating electrode 47 in the figure) into a plurality of electron beams. In the interest of brevity, only the two electron beams 50 and 52 are shown in FIG. 7 which are deflected by the angle $\beta$.

As can be seen from the figure, the radius of curvature R of the phosphor surface 43 is greater than the distance L between the center of deflection and the panel. The circumference of a circle of the radius L having a center at the center K of deflection is disposed in a position shown in a broken line in the figure. In FIG. 7, a single beam produced by the electron gun unit 46 scans the phosphor surface 43 in the direction of the arrow S. The scanning is simultaneously as the beam is converted into a plurality of electron beams by the beam-oscillating electrode 47. Thus, there is almost no difference between the angle <PaKQa and the angle <PbKQb. The angle <PaKQ is formed by an electron beam 52a striking the phosphor screen at a point Pa for an instant while it is not under the influence of a deflecting field and the same electron beam striking the phosphor screen at a point Qa after being oscillated. The angle <PbKQb is formed by an electron beam 52b striking the phosphor screen at a point Pb and the same electron beam striking the phosphor screen at a point Qb after being oscillated.

It will thus be evident that a time lag should correspond to the time interval required for deflecting the electron beam through an angle <PaKQa ≈<PbKQb. This lag is imparted to the color signal for effecting intensity modulation of the electron beam 52. (In FIG. 7, electron beams in different positions are designated 52a, 52b and the like). The modulation is with respect to the color signal effecting intensity modulation of the electron beam 50. (In FIG. 7, electron beams in different positions are designated 50a, 50b and the like). A television picture represented by the electron beams 52 and 50 will be reproduced in all the portions of the phosphor screen 43 in good positional relationship. The positional relationship can be improved by an increase of the ratio $L/\overline{KX}$. The distance L extends between the center of deflection K and the phosphor screen. The distance $\overline{KX}$ extends between the center of deflection K and the center of beam conversion X.

This is also the case with the embodiment in which one electron beam is oscillated and separated into three electron beams by means of the beam-oscillating electrode 47 as shown in FIG. 6. A phosphor screen may also be of the type which comprises phosphor strips of three primary colors arranged in side by side relationship with one another. These strips are disposed normal to the direction of scanning S if the electron beams are produced by oscillating. The separating of a single electron beam are subjected to intensity modulation by color signals for primary colors. The time lags are provided relative to one another in accordance with the concept set forth with reference to FIG. 7. Thus, it will be possible to reproduce a color television picture with good concentration in all the areas of phosphor screen by eliminating a complex device for effecting convergence of electron beams. Hitherto, such a complex device has been required in a conventional triple-gun shadow-mask type color television picture tube.

In the third embodiment of this invention, a single electron beam is used, as described previously. This beam is oscillated and separated into electron beams of different colors in accord with the time division system. In order that television pictures of different colors reproduced by electron beams of respective colors may coincide with one another in space, time lags are provided as described previously. These lags are imparted to color signals with respect to a color signal used as a reference. (In FIG. 6, time lags of $\tau_1$ and $\tau_2$ are provided to the color signals of green and blue respectively with respect to the color signal of red). The width of a reproduced television picture is reduced by an amount corresponding to the maximum value of time lag with respect to the color signal used as a reference ($\tau_2$ in FIG. 6). This reduction in the width of reproduced pictures can be prevented or compensated for by reducing the horizontal flyback time.

The device of this invention has particular utility in television picture tubes of small type, and excellent results can be achieved with small picture tubes. The invention also makes it possible to provide a reproduced television picture of high concentration in picture tubes of a large type as well as in those of a small type, so long as the rate of horizontal deflection is made lower in the periphery than in the center.

From the foregoing description, it will be evident that the present invention offers many advantages. The device of this invention does without a convergence device and can operate with a low-deflection current. It is easy to assemble, low in cost, and susceptible to balancing of a white color. Moreover, it can reproduce color pictures with a high purity. The invention also makes it possible to increase the brightness of a reproduced picture because the use of a shadow-mask of the slit type is conductive to increased transmittability of the electron beams.

Thus, the present invention makes it possible to produce, at low cost, a color television picture reproducing device having better characteristics and easier to effect adjustments.

While the invention has been described with reference to preferred embodiments, it is to be understood that the invention is not limited thereto, and that many changes and modifications may be made therein without departing from the spirit and scope of the invention. Therefore the claims are to be construed to cover all equivalent structures.

What I claim is:

1. A color television picture reproducing device comprising a phosphor screen having phosphors affixed thereto, electron-emitting means for producing a plurality of electron beams, means for directing said beams toward said phosphor screen with each of said beams being directed at an angle which is different than the angle at which either of the other of said beams is directed, deflecting means for deflecting the electron beams produced by said electron-emitting means, and means for imparting time lags to a plurality of color signals representing primary colors, said lags effecting an intensity modulation of the electron beams, whereby a plurality of pictures are reproduced on said phosphor screen when electron beams strike the phosphors in the phosphor screen, said plurality of pictures being made to coincide with one another in space.

2. A color television picture reproducing device as defined in claim 1 in which said electron-emitting means is a multiple electron gun unit.

3. A color television picture reproducing device as defined in claim 1 in which said electron-emitting means is a single electron gun unit, and the device further comprises means for converting a single electron beam produced by said single electron gun unit into a plurality of electron beams.

4. A color television picture reproducing device as defined in claim 1 in which there are three of said plurality of electron beams produced by said electron-emitting means, a first of said three electron beams reaching said phosphor screen earlier than the other two electron beams, a second electron beam reaching said phosphor screen slightly later than the first electron beam, and a third electron beam reaching said phosphor screen slightly later than the second electron beam.

5. A color television picture reproducing device as defined in claim 3 further comprising beam-separating means disposed intermediately between said single electron gun unit and said deflecting means, stepped wave-producing means for producing a voltage having a stepped waveform, said stepped wave being supplied to said beam-separating means, electronic switch means for effecting a time division of the plurality of color signals representing primary colors applied to color signal input electrodes of the single electron gun unit, and means for synchronously operating said electronic switch means and said stepped wave-producing means.

6. A color television picture reproducing device comprising a phosphor screen having phosphors affixed thereto, electron-emitting means for producing a plurality of electron beams directed toward said phosphor screen, said beams impinging respectively on different points on said phosphor screen, deflecting means for deflecting said electron beams, means for providing a television signal having a plurality of color signals representing primary colors, means for imparting time delays to said plurality of color signals, and means for intensity modulating said electron beams with the delayed color signals respectively whereby a plurality of pictures are reproduced on said phosphor screen when the electron beams strike the phosphors on the phosphor screen, each of said time delays being determined so that said plurality of pictures coincide with one another in space.

7. A color television picture reproducing device as defined in claim 6 in which said electron-emitting means is a multiple electron gun unit.

8. A color television picture reproducing device as defined in claim 6 in which said electron-emitting means is a single electron gun unit, and the device further comprises means for converting a single electron beam produced by said single electron gun unit into a plurality of electron beams.

9. A color television picture reproducing device as defined in claim 8 wherein said gun unit has at least one color signal input electrode, said device further comprising beam-separating means intermediately disposed between said single electron gun unit and said deflecting means, stepped wave-producing means for producing a voltage having a stepped waveform, means for supplying said stepped wave to said beam-separating means, electronic switch means for effecting a time division of the plurality of color signals, means for applying said said time division signals representing primary colors to said color signal input electrode of the single electron gun, and means for synchronously operating said electronic switch means and said stepped wave-producing means.

10. A color television picture reproducing device as defined in claim 6 in which three of said plurality of electron beams are produced by said electron-emitting means, a first of said three electron beams scanning any point on said phosphor screen earlier than the other two electron beams scanning said point, a second electron beam scanning said point later than the first electron beam, and a third electron beam scanning said point later than the second electron beam.

* * * * *